United States Patent [19]

Newman

[11] 4,240,354
[45] Dec. 23, 1980

[54] TRUCK MOUNTED RAILROAD CRANE RAIL GEAR ASSEMBLY

[76] Inventor: Timothy L. Newman, 700 N. Liberty, Jerseyville, Ill. 62050

[21] Appl. No.: 911,637

[22] Filed: Jun. 1, 1978

[51] Int. Cl.³ .............................................. B61C 13/00
[52] U.S. Cl. ................................................. 105/215 C
[58] Field of Search ..................... 105/1 A, 215, 215 C

[56] References Cited

U.S. PATENT DOCUMENTS

| | | | |
|---|---|---|---|
| 2,965,046 | 12/1960 | Chambers | 105/215 R |
| 3,144,837 | 8/1964 | Patton | 105/215 R |
| 3,228,350 | 1/1966 | Cox | 105/215 C |
| 3,338,184 | 8/1967 | Fisher | 105/215 C |
| 3,633,514 | 1/1972 | Deike | 105/215 C |
| 3,701,323 | 10/1972 | Cox | 105/215 C |
| 3,980,025 | 9/1976 | Olson et al. | 105/215 C |

*Primary Examiner*—Richard A. Bertsch
*Attorney, Agent, or Firm*—Michael Kovak

[57] ABSTRACT

A train rail gear assembly for use with truck mounted railroad cranes and the like, including fluid actuated cylinder and compression spring means operably associated to one another for raising and lowering rail gears and for shifting weight from the vehicle frame to the compression spring means.

5 Claims, 4 Drawing Figures

TRUCK MOUNTED RAILROAD CRANE RAIL GEAR ASSEMBLY

SUMMARY OF THE INVENTION

This application is related to my following copending patent applications: Ser. No. 911,597, filed June 1, 1978, entitled "TRUCK MOUNTED RAILROAD CRANE MAIN MAIN BED FRAME"; Ser. No. 911,627, filed June 1, 1978, entitled "TRUCK MOUNTED RAILROAD CRANE BOOM SECTION; and Ser. No. 911,638, filed June 1, 1978, entitled "TRUCK MOUNTED RAILROAD CRANE HYDRAULIC SWIVEL MEANS".

The present invention is in the field of truck mounted railroad cranes which are convertible highway/railway vehicles capable of highway travel on a truck chassis, as well as being convertible for travel on train rails through extensible front and rear train rail gear, which guide the vehicle on train tracks, while allowing the rubber wheels of the vehicle to move the vehicle to the desired location. Such vehicles are principally used for train derailments, although they are useful for other train and rail construction and maintenance operation.

At the site of a train derailment, the truck mounted railroad crane, which has previously been driven as a truck over highways and then positioned on or adjacent tracks leading to the train derailment, is ready to reposition de-railed train cars back onto tracks from which they have become derailed. This is achieved through the swiveling crane boom also mounted on the truck chassis. The operator of the truck mounted railroad crane positions himself in the crane cab to operate the crane controls that raise, lower and swing the crane boom for repositioning the de-railed railcar back on train rails.

Truck mounted railroad cranes are thus versatile pieces of equipment that require both highway and railway travel, as well as operation and control of crane boom. As will also be appreciated, such vehicles must withstand rigorous conditions encountered in transporting same and in operating the crane.

One of the major problems encountered in truck mounted railroad cranes is in the function and operation of train rail gears. Present designs of train rail gear are relatively complex in structure and limited in function. More specifically, the present rail gear designs utilize complex power actuator devices which do not accommodate for weight redistribution when the train rail gears are extended or shocks that occur during movement over various rail/terrain mountings.

Accordingly, the present invention is directed to a new and improved train rail gear assembly that overcomes the aforementioned deficiencies of prior art designs.

A more specific object of the present invention is to provide a train rail gear assembly for various rail vehicle devices, including truck mounted railroad cranes, sand blasting equipment, rail tie changers, bridge repair vehicles and other like rail vehicles, where the train rail gears readily accommodate weight redistribution when the rail gears are extended, as well as shocks that occir during movement over various rail/terrain mountings.

These and other objects and advantages of the present invention will become apparent from the ensuing description.

DESCRIPTION OF THE PREFERRED EMBODIMENTS

While the train rail gear assembly is disclosed in connection with truck mounted railroad cranes, it is to be understood that such assemblies also find usefulness with other railroad vehicles such as sand blasting equipment, rail and rail tie changers, bridge repair vehicles, and other railroad vehicles where retractable and extensible rail gear assemblies are desired.

Figure 1:
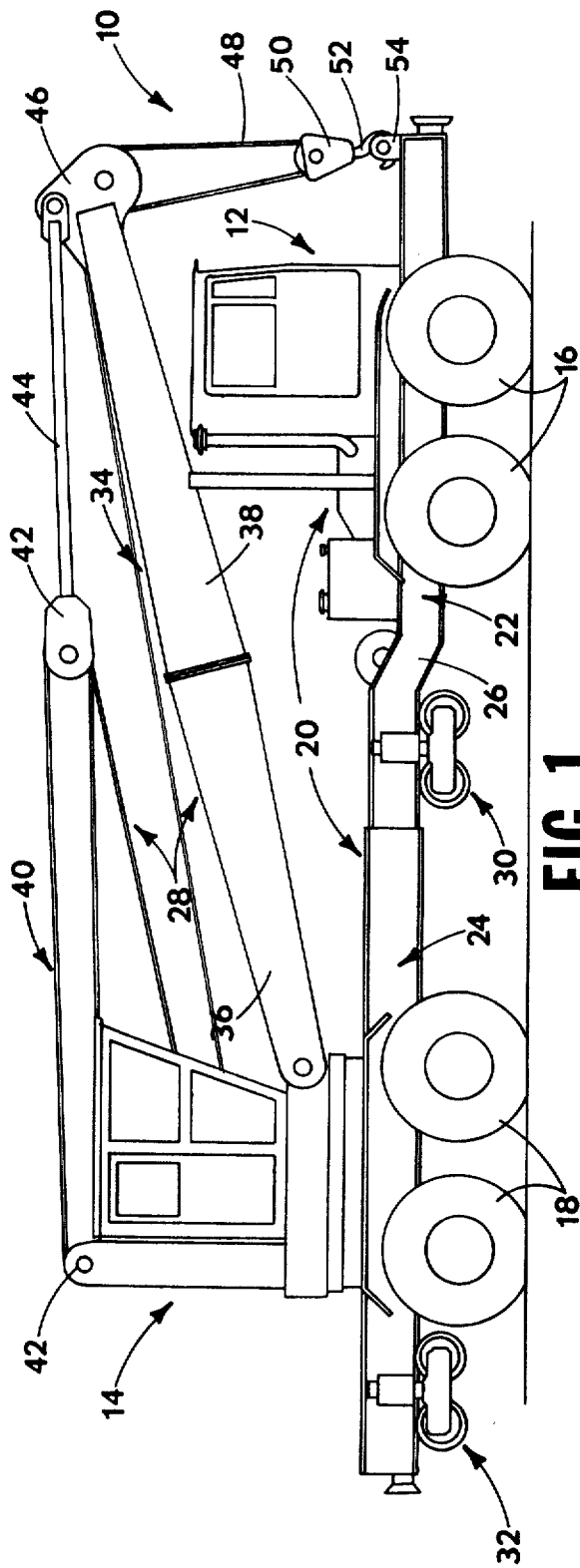
FIG. 1 is a side elevational view of a truck mounted railroad crane, including train rail gear assembly, which is constructed in accordance with the teachings of the present invention.
Figure 2:
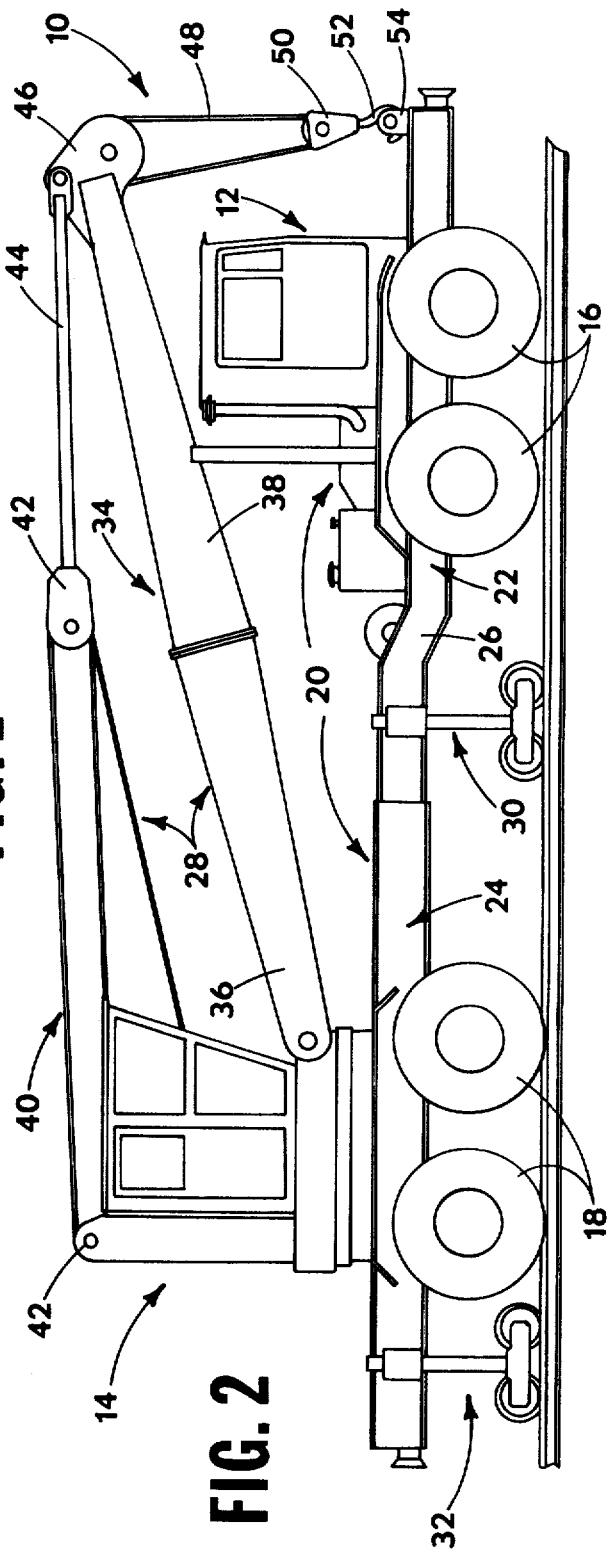
FIG. 2 is a side elevational view, similar to FIG. 1, but showing the truck mounted railroad crane convertible for travel on train rails.

FIGS. 1 and 2 of the drawings show my preferred design of truck mounted railroad crane 10 which includes a truck cab 12 at the front end and a crane cab 14 at the rear end. The truck cab 12 is mounted over the front pneumatic rubber tires 16 while the crane cab 14 is mounted over the rear pneumatic rubber tires 18. The truck cab 12 and crane cab 14 are interconnected through the vehicle frame 20 that includes a truck chassis frame 22 and crane bed frame 24. It will be seen that the truck chassis frame 22 is mounted lower than crane bed frame 24 through the angular interconnecting frame structure 26. There are several reasons for this including maintaining the crane boom superstructure 28 at the lowest possible height when traveling over highways, as shown in FIG. 1, while enabling the truck cab 12, frame 22 and tires 16 to be lifted off the railroad tracks, as shown in FIG. 2, to allow transporting of the truck mounted railroad crane 10 to the desired location over railroad tracks.

This lifting of the truck cab 12, frame 22 and tires 16 at the front end of the truck mounted railroad crane 10 is achieved by the front and rear train gear 30, 32 that are mounted on the crane bed frame. As seen in FIG. 1, the front and rear train rail gear 30, 32 respectively are maintained in a retracted position to allow the front and rear pneumatic rubber tires 16, 19 respectively to move the truck mounted railroad crane 10 over highways. However, when the desired train rail location has been reached, the truck mounted railroad crane 10 is driven into a straddle position over train rails, and the front and rear train rail gears 30, 32 respectively are lowered or extended to raise the truck cab 12, truck chassis frame 22 and front pneumatic rubber tires 16 off of the railroad tracks. This enables the front and rear train rail gears 30, 32 respectively to guide the truck mounted railroad crane 10 over train rails, while allowing inside pairs of wheels (not shown) of the rear pneumatic rubber tires 18 to rest upon and engage the train rails. In this way, the truck mounted railroad crane 12 is transported over train rails by the driven rear pneumatic rubber tires 18 of the truck mounted railroad crane 10. When the truck mounted railroad crane reaches the desired location, such as a train derailment, train rail construction, train rail maintenance operation or the like, the crane boom superstructure 28 may then be put into operation to raise, lower and swing train cars and the like, as may be desired. The crane boom superstructure 28 includes a boom 34 that is hingedly mounted to the crane cab 14 for raising and lowering of the boom 34, as well as for swiveling or rotational movement of the crane cab 14 and associated boom 34 relative to the crane bed frame 24. The boom 34 comprises two sections, and inboard section 36 and an outboard section 38. The inboard section 36 is pivotally or hingedly attached to the crane cab 14 while the outboard section 38 is supported and its angular position controlled by means of the hoisting cables 14 reeved through suitable hoisting cable sheeves 42 and the connecting link 44 that extends between the outermost sheeve 42 and the fixed block sheeve 46 mounted at the free end of the outboard section 38. The fixed block sheeve 46 threadably carries a lift cable 48 which is also threaded over a load engaging block 50 that includes a hook 52. When not in use, the hook 52 is restrained by the shaft block 54 mounted at the front of the truck chassis frame 22, as seen in FIGS. 1 and 2.

Figure 3:
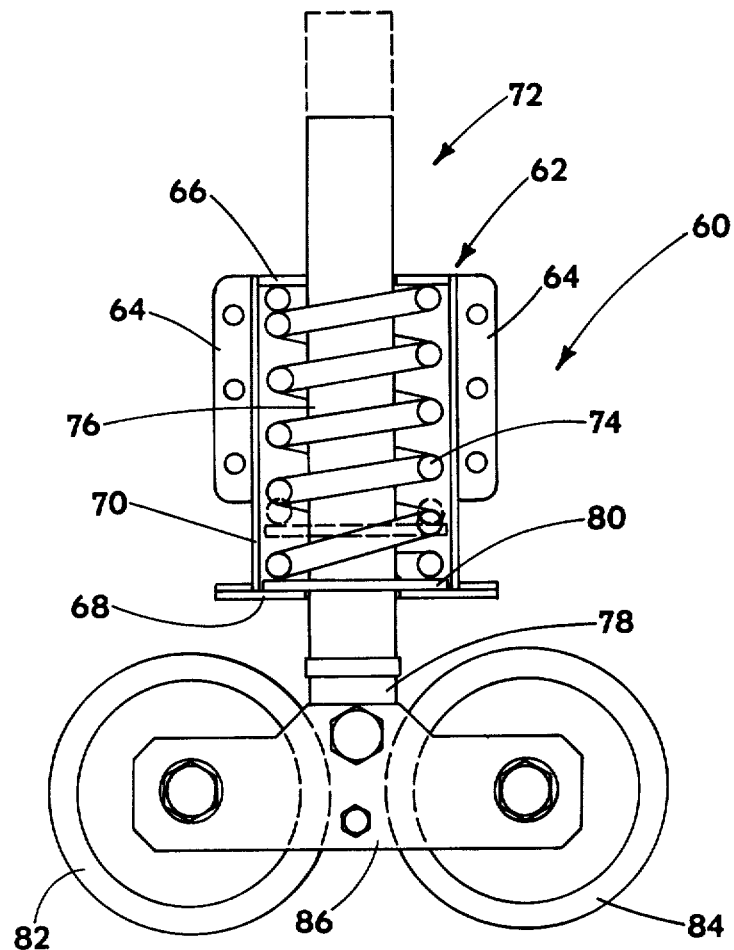
FIG. 3 is a side elevational view, partly in section, of the train rail gear assembly in retracted position, with a phantom representation of one of the components thereof, when in extended position.

With the above general description of components of the truck mounted railroad crane 10, attention is now directed to the front and rear train rail gear assemblies 30, 32 as best seen by the representative assembly shown in FIG. 3, for a specific understanding of the improvements which have been incorporated in the train rail gear assemblies 30, 32.

It is to be understood that except for the length of travel, the construction and operation of the front and rear train gear assemblies 30, 32 is the same, and therefore, FIG. 3 shows a typical train gear assembly for use at the front or rear of a railroad vehicle. In truck mounted railroad cranes 10, the front train gear assembly 30 is arranged to extend a greater distance than the rear train gear assembly 32 to lift the front pneumatic rubber tires 16 of the truck mounted railroad crane 10 off the tracks. When this occurs, weight is shifted to the rear of the truck mounted railroad crane 10; however, the front and rear train gear assemblies 30, 32 respectively accommodate and redistribute the weight at the rear end of the truck mounted railroad crane 10, as will now be discussed.

Figure 4:
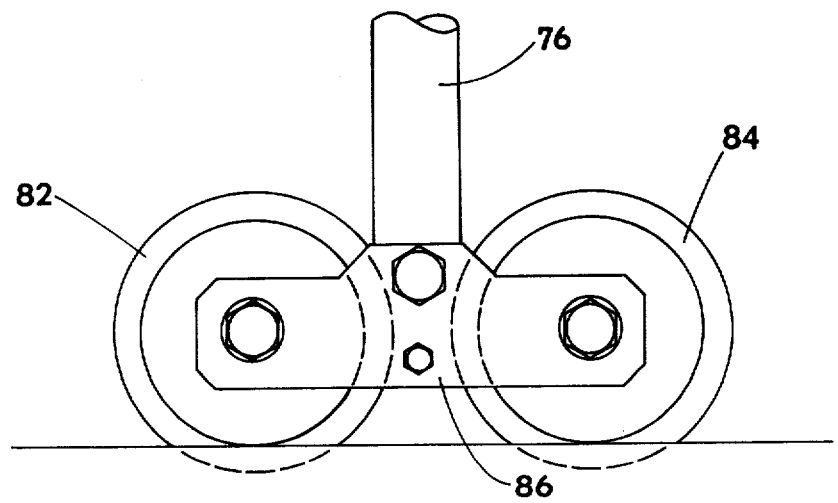
FIG. 4 is a fragmentary side elevational view of the train gears when extended to engage train rails.

The representative train gear assembly 60 shown in FIGS. 3 and 4 of the drawings is typical of the front and rear train gear assemblies 30, 32 respectively shown in FIGS. 3 and 4 of the drawings, except for length of travel, as explained above. The train gear assembly 60 includes housing 62 having mounting plates 64 for securing the train gear assembly 60 to a vehicle frame at the locations, for example, shown in FIGS. 1 and 2. The housing 62 includes a top wall 66, a bottom wall 68, and a sidewall 70.

Within the housing 62, there is provided a fluid actuated cylinder 72 and a compression spring 74 extending about the fluid actuated cylinder 72 within the housing 62. The fluid actuated cylinder has two sections, a chamber section 76 and a piston section 78. The chamber section 76 of the fluid actuated cylinder 72 extends through aligned and closely dimensioned openings in the top wall 66 and bottom wall 68 of the housing 62 for substantially vertical movement. Actually, the chamber section 76 of the fluid actuated cylinder 72 is limited in its upward movement since the compression spring 74 is trapped between the top wall 66 of the housing 62 and the flange 80 fixedly attached to the chamber section 76 of the fluid actuated cylinder 72, which flange 80 normally rests on the bottom wall 68 of the housing 62. Until the compression spring 74 is compressed from the full to the dotted line position shown in FIG. 3, as will be explained hereafter, the chamber section 76 of the fluid actuated cylinder 72 does not travel. When travel does occur, the closely dimensioned relationship between the outer margin of flange 80 and the inner surface of the side wall 70, together with the aligned and closely dimensioned openings in the top wall 66 and bottom wall 68 of the housing 62, constrains the chamber section 76 for substantially vertical movement.

Such closely dimensioned relationships also assist in the substantially vertical movement of the piston 78 of the fluid actuated cylinder 72 since the piston section 78 is slidably received within the chamber 76. Thus, when hydraulic fluid, for example, is directed to the fluid actuated cylinder 72 for lowering the piston section 78, in a manner well known in the art, the piston section 78, carries with it, at its lower end, a pair of rotatably mounted flanged wheels 82, 82 which are rotatably mounted to the rail gear pad 86.

FIG. 3 shows the rail gear assembly 60 in retracted position, while FIG. 4 shows the extension of the piston section 78 of the fluid actuated cylinder 72 and the rotatably mounted flanged wheels 82, 84 for positioning the latter on railroad tracks. In practice, the front and rear rail gear assemblies 30, 32 respectively shown in FIGS. 1 and 2, though perhaps extending different distances, are designed to bring the associated flanged wheels thereof in position relative to railroad tracks, to remove at least the front pneumatic rubber tires from the railroad tracks.

The construction and operation of the rail gear assembly 60 further assists by providing for weight redistribution when the rail gear assemblies are extended and in engagement with railroad tracks. Thus, with the piston section 76 fully extended, further movement is only possible through the compression of the compression spring 74 as the flange 80, attached to the chamber section 76 of the fluid actuated cylinder 72, compresses the compression spring 74 between it and the wall 66 of the housing 62. This not only allows the compression spring 74 to "take over" for the fluid actuated cylinder 72, but allows for the weight previously shifted to the rear of the truck mounted railroad crane 10, when it assumes the position shown in FIG. 2, to be shifted onto the compression springs 74, thereby allowing for weight to be shifted off of the rear end of truck mounted railroad crane 10.

As a further feature of the present invention, the compressed condition of the compression spring 74 provides "forgiveness" to accommodate for shocks that occur during movement over various rail/terrain mountings. Thus, the fluid actuated cylinders 72 are protected from shocks occurring during movement as the result of the compressed compression spring 74.

From the foregoing, it will be appreciated that the present invention provides simple, yet strong and rugged extensible rail gear assembly which may be used in a variety of railroad vehicles.

I claim:

1. A train rail gear assembly for use with vehicle frames of truck mounted railroad cranes and other like railroad vehicles, comprising housing means having top, bottom and side walls mounted to said vehicle frame, a fluid actuated cylinder associated with said housing means and extending through the top and bottom walls of said housing means, and a compression spring extending about the fluid actuated cylinder including a piston and chamber section, the fluid actuated cylinder piston section at its lower end being connected to a pair of rotatably mounted flanged wheels adapted for use with railroad track, the chamber section of the fluid actuated cylinder having flange means associated therewith within the housing means for engaging the bottom wall of the housing means to limit downward movement of the chamber section of the fluid actuated cylinder, said compression spring being mounted in non-compressed condition in said housing means between the flanged means of the fluid actuated cylinder chamber section and the top wall of the housing means, said fluid actuated cylinder piston section being operable to first lower said pair of rotatably mounted flanged wheels a predetermined distance for a engagement with a railroad track, and said compression spring being thereafter compressed between the flanged means of the fluid actuated cylinder chamber section and the top wall of the housing means whereby to act as a cushion and shift weight from the vehicle frame to the compressed compression spring.

2. The train rail gear assembly as defined in claim 1 wherein said fluid actuated cylinder is hydraulically operated.

3. The train rail gear assembly as defined in claim 2 wherein the chamber section of the fluid actuated cylinder extends through the top and bottom walls of the housing means.

4. The train rail gear assembly as defined in claim 3 wherein the chamber section of the fluid actuated cylinder is constrained for substantially vertical movement in its limited upward travel by closely dimensioned openings in the top and bottom walls of the housing means and closely dimensioned relationships between the outer margin of the flanged means and the inner surface of the housing means side walls.

5. The train rail gear assembly as defined in claim 4 wherein the housing means includes mounting plates on each side thereof for attaching same to the vehicle frame.

* * * * *